United States Patent [19]

Qasim

[11] 4,162,057

[45] Jul. 24, 1979

[54] LINEAR RETRACTABLE SEAL VALVE

[75] Inventor: Javed Qasim, Diamond Bar, Calif.

[73] Assignee: Aerojet-General Corporation, El Monte, Calif.

[21] Appl. No.: 893,708

[22] Filed: Apr. 5, 1978

[51] Int. Cl.² ............................................. F16K 25/00
[52] U.S. Cl. .................................... 251/168; 251/197; 251/199
[58] Field of Search ................ 251/167, 168, 197, 199

[56] References Cited

U.S. PATENT DOCUMENTS

| 1,136,841 | 4/1915 | Shaw ....................................... 251/167 |
| 1,825,544 | 9/1931 | Redding ............................. 251/197 X |

FOREIGN PATENT DOCUMENTS

| 652488 | 11/1937 | Fed. Rep. of Germany ............ 251/167 |
| 696083 | 8/1953 | United Kingdom ....................... 251/197 |

OTHER PUBLICATIONS

Heinen 2,977,086 3-1961.
The Design of Valves and Fittings, 1953, G. H. Pearson.

*Primary Examiner*—Harold W. Weakley
*Attorney, Agent, or Firm*—Edward O. Ansell; T. Reid Anderson

[57] ABSTRACT

A linear retractable seal valve having an inlet and outlet port and a fluid passageway therebetween with a lateral passageway perpendicular to the fluid passageway and with a wedge sealing-slip assembly slideably held at opposite side edges of the wedge to two guide rails of the valve body and moveable from a distant valve open first location within the lateral passageway to a second location between inlet and outlet ports of the valve. The slip-wedge assembly has at least one closure slip with an inside face of the slip slideably engaging a tapering face of the wedge and with the slip at said second location being restrained from further longitudinal movement and moveable in a perpendicular direction of the longitudinal assembly movement into closure engagement with one of the valve ports. The guide rails are diametrically-opposed and extend longitudinally of the inside face of the lateral passageway into the fluid passageway.

At least one of the guide rails terminates at the second location on the inside wall of the fluid passageway with the end surface of the terminated rail providing a ramp. The wedge on at least one side edge thereof has a locking notch which extends in a transverse direction to the longitudinal assembly movement; this notch is in the side edge of the wedge which is adjacent the terminated rail. An actuating roller which is in engagement with a supporting surface of the slip is positioned to move into and out of the wedge notch at the second valve location; when the valve is in the locking notch of the wedge it engages the longitudinal edge of the adjacent guide rail and serves to lock the slip to the wedge, thereby precluding perpendicular movement of the slip during longitudinal passage of the assembly between the two valve locations. The roller, when in another position, unlocks the slip from the wedge by moving out of the locking notch and out of contact with the longitudinal edge of the rail and into engagement with the ramp at the end of the rail.

11 Claims, 22 Drawing Figures

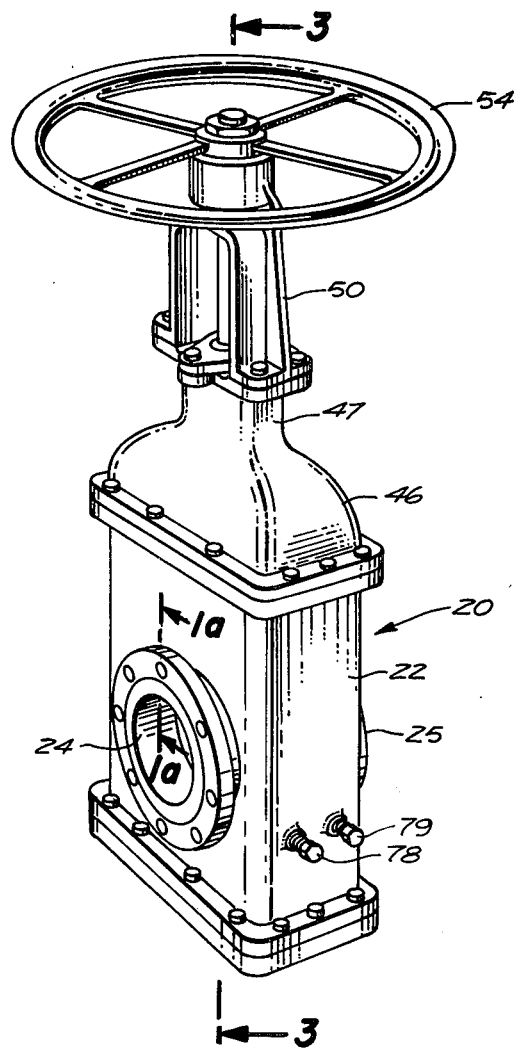
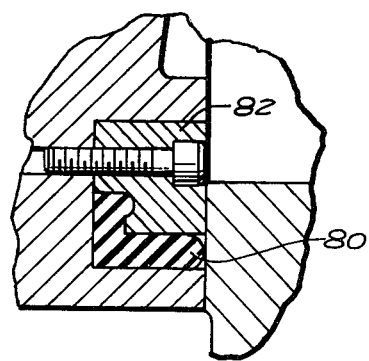
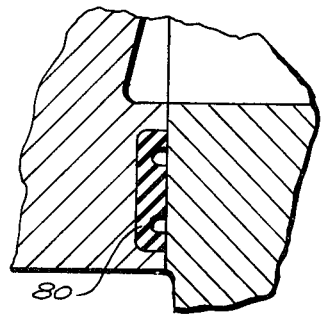
Fig. 1
Fig. 1a
Fig. 1b

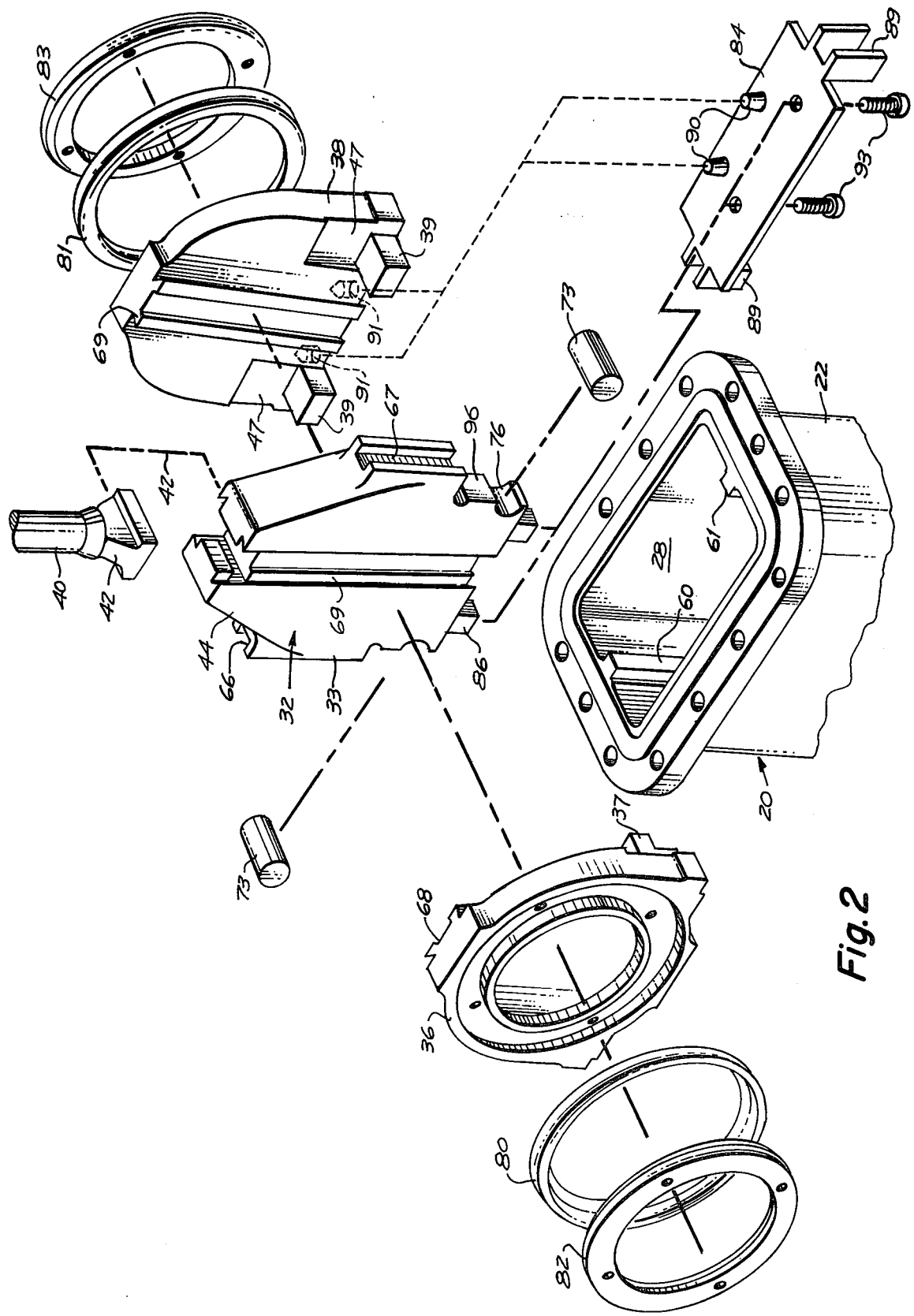

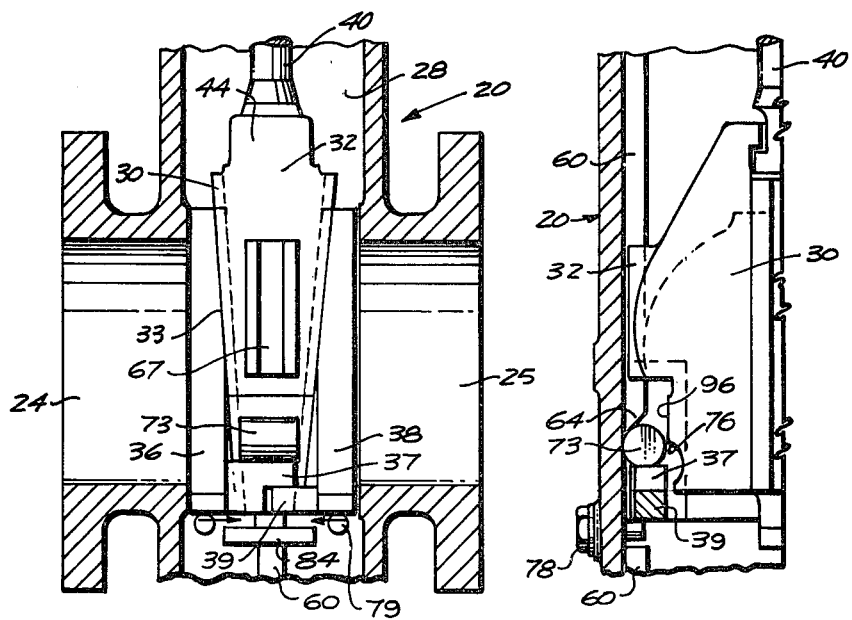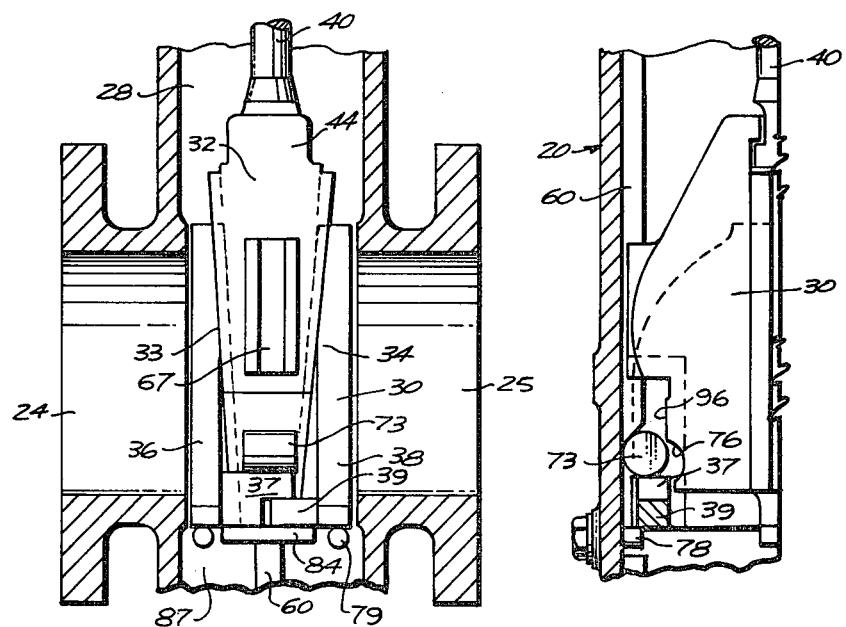

LINEAR RETRACTABLE SEAL VALVE

This invention relates to a gate type seal valve and more particularly to a linear retractable seal valve having a body with an inlet and outlet port and a fluid passageway therebetween in which a wedge sealing-slip assembly is moved from a distant first location of a lateral passageway to a second location in the fluid passageway between inlet and outlet of the valve at which latter location the sealing slips are wedged outwardly into closure engagement with the valve ports.

BACKGROUND OF THE INVENTION

The petroleum and refinery industries use a large number of gate valves for controlling flow of liquid and gas products. An earlier retractable seal gate valve is illustrated in U.S. Pat. No. 2,977,086, Heinen; this valve is closed by a sequential motion including a downward vertical movement of a wedge-slip assembly through a lateral passageway to a position in a fluid-passageway between inlet and outlet ports of the valve, followed by a horizontal movement of the sealing slips into engagement with the respective adjacent valve seats. The open position is achieved by a reverse sequential movement, wherein the slips are first moved at a right angle away from the respective port seats and thereafter the wedge-slip assembly is moved in an upward vertical direction through the lateral passageway away from the fluid passageway of the valve.

Gate valves of this general type sometimes employ diametrically-opposed guide rails which extend longitudinally of the inside face of the lateral passageway with the wedge-slip assembly being moveably held by grooves at opposite side edges of the wedge to the guide rails of the valve body. Wedge-slip valves, perhaps because of their sequential opening and closing motions and complexity of parts, require a stringent engineering design to assure reliability and trouble free operation.

SUMMARY OF THE INVENTION

The improved valve of the invention provides an efficient perpendicular pull-off of the sealing slips from the port seats of the valve with absence of seal abrasion and wear. The structure of the invention provides positive locking of sealing slips away from the inner wall of the valve body while the wedge-slip assembly is being moved between open and closed valve positions; this is achieved by providing a roller mechanism which locks the sealing slips to the wedge during transport of the wedge-slip assembly between valve locations.

The linear retractable seal valve of the invention has a valve body with inlet and outlet ports and a fluid passageway therebetween and a lateral passageway perpendicular to the fluid passageway. A wedge-slip assembly is moveable longitudinally therein from a valve-open first location within the lateral passageway to a distant second, valve-closed location where the assembly is positioned in the fluid passageway between the two ports of the valve. The assembly has at least one closure slip, usually two, with the inside face of the slip slideably engaging a tapering face of the wedge. The slip is restrained at the second valve location from further longitudinal movement and there is moveable in a perpendicular direction of longitudinal assembly movement into closure engagement with an adjacent valve port. The valve of the invention has two diametrically-opposed guide rails extending longitudinally of the inside face of the lateral passageway; the two rails continue from the lateral passageway into the fluid passageway of the valve. The assembly is moveably held by grooves at opposite side edges of the wedge to the two guide rails of the valve body. At least one of the guide rails terminates (usually both in most embodiments of the valve) at the second valve location on the inside wall of the fluid passageway; the end surface of the terminated rail provides a ramp. The wedge has a locking notch on at least one side edge thereof which notch extends in a transverse direction to the longitudinal assembly movement and is adjacent the terminated rail. A principle component of the valve lock-actuating mechanism is a roller which is parallel to the locking notch and in engagement with a supporting surface of the slip; the roller is positioned to move into and out of the notch at the second valve location. The roller, when in the locking notch of the wedge, engages the longitudinal edge of the adjacent guide rail and in this position serves to lock the slip to the wedge, thus precluding perpendicular movement of the slip during longitudinal movement of the assembly between the two valve locations. The roller unlocks the slip from the wedge by moving out of the locking notch and out of contact with the longitudinal edge of the rail and into engagement with the ramp at the end of the rail. During an initial step in the opening of the valve, the roller in the latter position forestalls reverse longitudinal movement of the slip until completion of full perpendicular disengagement of slip from the adjacent valve port.

DESCRIPTION OF THE DRAWINGS

FIG. 1 is a perspective view of the valve of the invention detached from fluid line;

FIGS. 1(a) and 1(b) are fragmentary cross-sectional views taken along line 1(a)—1(a) of FIG. 1 providing details of alternative sealing elements;

FIG. 2 is an exploded view of critical elements of a preferred valve of the invention;

FIG. 5 is a time sequential view to that of FIGS. 3 and 4 in opening of the valve showing the wedge member in a slightly elevated position with wedge locking groove approaching the level of the locking roller and with the closure slips out of engagement with adjacent valve ports;

FIG. 6 is a sectional view in the same time instant as FIG. 5 but in a plane perpendicular to the latter figure showing the closure slips moving in perpendicular displacement away from the two ports of the valve;

FIG. 7 is a sectional view later in time sequence to that of FIG. 5 with the wedge at a somewhat more elevated position and with the wedge locking notch in near alignment with the detent roller;

FIG. 8 is at the same instant as FIG. 7, but in a plane perpendicular to the latter figure, showing the wedge lifting lug in initial engagement with the two closure slips which slips are out of port closure engagement but still in alignment with the two ports of the valve;

Figure 10:
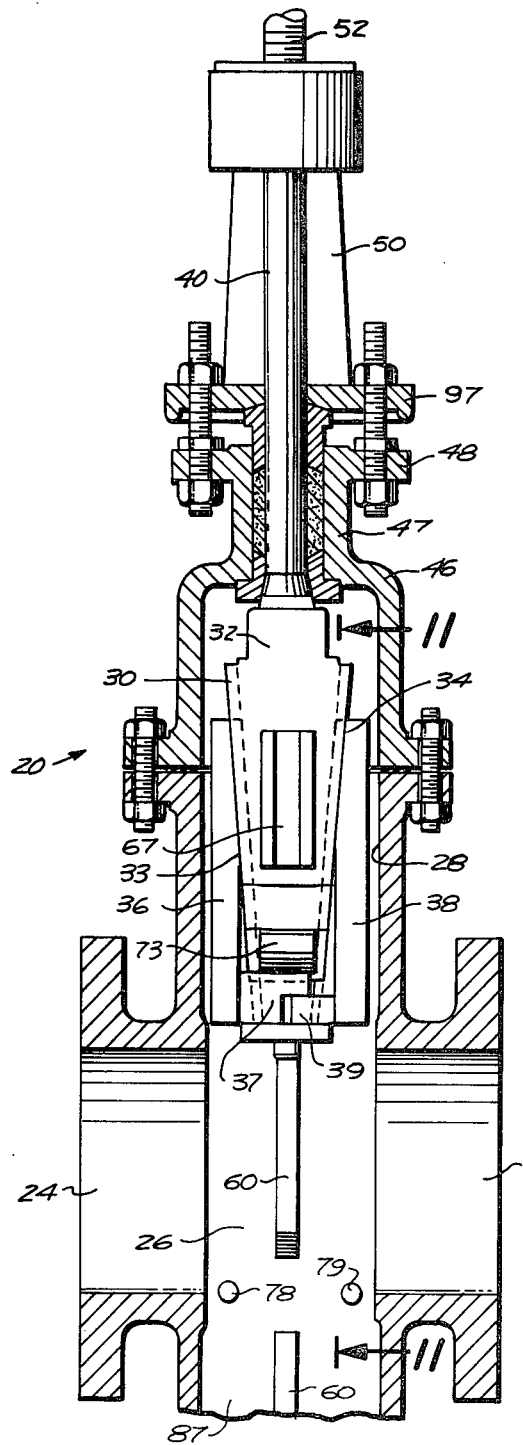
FIG. 10 is a longitudinal sectional view, partly in elevational, in considerable later time sequence to that of FIG. 9 and in a plane perpendicular to the latter figure showing the closure slip-wedge assembly in the valve full open position with the inlet and outlet ports of the valve clear to fluid flow.

The linear retractable seal valve 20 of the drawings has a base body 22 with aligned two ports 24, 25 and a fluid passageway 26 therebetween. The body 22 has a lateral passageway 28 perpendicular of the fluid passageway 26 with a wedge-closure slip assembly 30 being disposed in the latter passageway and moveable longitudinally therein from a first valve open position as shown in FIG. 10 where the assembly is positioned away from the fluid passageway 26 to a spaced second valve closed location where the assembly 30 is positioned in the fluid passageway 26 between the inlet and outlet ports 24, 25 of the valve as best seen in FIGS. 3 and 4.

Figures 3, 4:
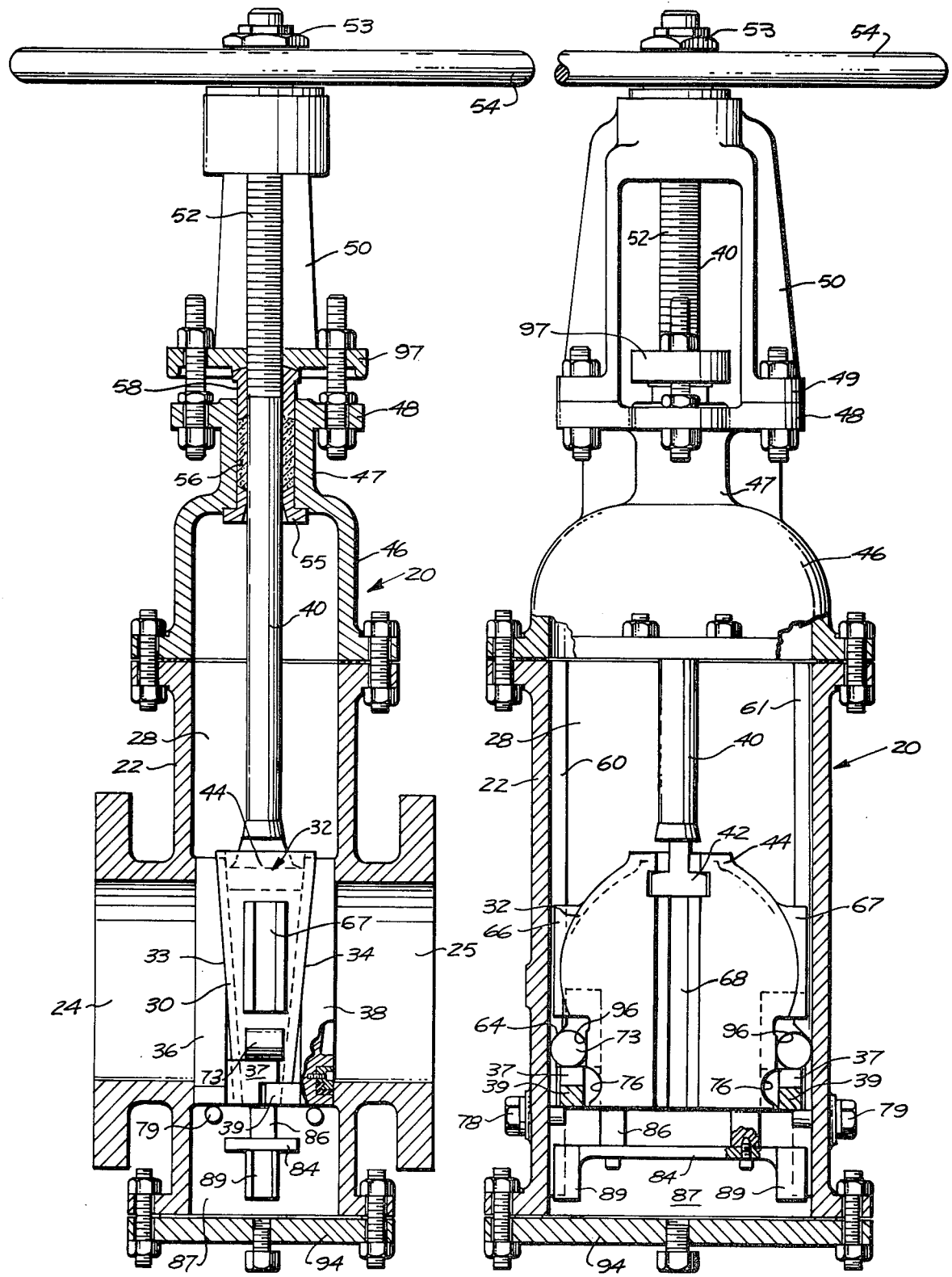
FIG. 3 is a longitudinal sectional view taken, partly in elevational, along line 3—3 of FIG. 1 showing the valve in its fully closed position with closure slips forced outwardly by a central wedge member into engagement with inlet and outlet ports of the valve.
FIG. 4 is a partially cutaway elevational view in a plane perpendicular to that of FIG. 31 and with one of the closure slips removed to more fully illustrate the central wedge and its suspended lifting lug as well as two spaced locking roller detent mechanisms.

The assembly 30 is made up of a central wedge member 32 which slideably carries on its opposite tapered faces 33, 34 two closure slips 36, 38 (see FIGS. 2 and 3). An elongated stem member 40 is held by a disconnectable T-coupling 42 (FIGS. 2 and 4) to the thick edge 44 of the wedge 32. The lateral passageway 28 of the valve body 22 is closed by a bonnet 46 (FIG. 4) which has a necked-down portion 47 through which the stem member 40 extends. The bonnet 46 is fastened through an upper flange 48 to a lower flange 49 of a yoke member 50 through which assemblage the stem 40 extends. The outer end 52 of the stem 40 is threaded to engage a nut 53 and hand wheel 54, the turning of which raises and lowers the stem member 40 and the wedge-slip assembly 30 fastened thereto. As best seen in FIG. 3 the elongated stem member 40 extends through a seat bushing 55 and a long packing 56 located in the necked-down portion 47 of the bonnet 46. The packing 56 at its upper end engages a gland 58 (FIG. 3) clamped between the flange 48 of the bonnet 46 and the flat plate 97 of the yoke 50.

The stem member 40 and hand wheel 54 provides means for moving the wedge-slip assembly 30 longitudinally of the lateral passageway 28. Means for moveably holding the wedge-slip assembly 30 to the valve body 22 is provided by two diametrically-opposed guide rails 60, 61 (FIGS. 2 and 4) which extend longitudinally of the inside face of the lateral passageway 28. As seen in FIG. 4, the guide rails 60, 61 terminate at the second location of the assembly on the inside wall of the fluid passageways 26. The end surfaces of the terminated rails 60, 61 are sloped to provide ramps 64, the purpose of which will be described later. The wedge-slip assembly 30 is moveably held to the valve body 22 (FIG. 2) by grooves 66, 67 in the side edges of the wedge which slideably engage the opposing guide rails 60, 61. It will be seen that the two guide rails 60, 61 lie in a plane paralleling the spaced inlet and outlet ports 24, 25 of the valve.

With reference to FIGS. 2 and 3, it will be seen that the closure slips 36, 38 are slideably held respectively to the adjacent tapering faces 33, 34 of the wedge member 32 by dove tail connections 68, 69. The closure slips 36, 38 (see FIGS. 2 and 3) have on their respective inside faces adjacent their outer edges two spaced lugs which extend perpendicularly of direction of longitudinal movement of the assembly with the two lugs 37 of slip 36 overlying lugs 39 of slip 38. The several lugs 37, 39 of the two slips 36, 38, each arises from a flat, vertical area 47 of its respective slip. Use of the overlying lug structural arrangement to tie the two slips together synchronize their longitudinal movement between closed and open positions of the valve; this direct contact structural arrangement precludes unsymmetrical movement of the slips which might occur with use of an intervening element for synchronizing purposes. The opposite side edges of the wedge 32 are cutaway at its thin edge as best seen in FIG. 2, to provide unencumbered space into which the respective lugs 37, 39 of the two slips 36, 38 may extend without engaging the interposed wedge 32. The unencumbered upper surfaces of the two overlying lugs 37 of the left hand slip 38 provide rolling supportive surfaces for rollers 73. The rollers 73 are usually circular but may be polygonal in cross section. The wedge 32 adjacent its thin edge has spaced locking notches 76 in its opposite side edges which notches extend the thickness of the wedge and open respectively toward one or the other of the adjacent rails 60, 61. Each of the rollers 73 has a first valve-open position wherein the roller occupies the associated locking notch 76 of the wedge and contacts the longitudinal edge of the adjacent guide rail. This relationship of elements in the first roller position provides means for locking the wedge 32 and slips 36, 38 together for longitudinal movement between the first assembly (valve open) position of FIG. 11 and the second assembly (valve close) position of FIG. 3. In the second, valve-closed roller position the respective rollers 73 have moved out of their locking notches 76 and out of contact with the longitudinal edges of the adjacent one of the two rails 60, 61. In moving between the two roller positions, each roller 73 contacts the sloping ramp 64 at the end of the adjacent guide rail.

Figure 11:
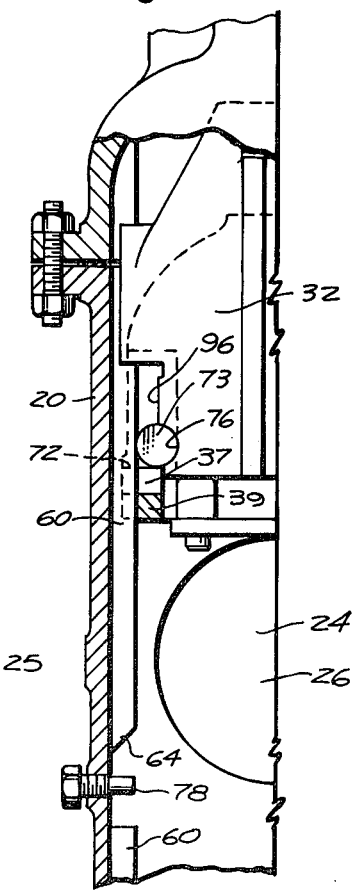
FIG. 11 is a sectional view taken along line 11—11 of FIG. 10.

In closing the valve 20, the wedge slip assembly 30 is moved from its open first location of FIG. 11 within the lateral passageway 28 to a spaced second location, that of FIG. 4, where the assembly is disposed in the fluid passageway 26 between the inlet and outlet ports of the valve. Means are provided at this second location for stopping longitudinal movement of the two closure slips 36, 38 when the respective slips are in alignment with the two ports 24, 25 while permitting further longitudinal movement of the wedge 32; this is accomplished by spaced stop pins 78, 79 (FIG. 4) that extend through the wall of the body 22 into engagement with the underside of the respective two slips. Remembering that the two closure slips 36, 38 (FIG. 2) are slideably held to the opposite tapering faces 33, 34 of the wedge 32, it will be understood that further longitudinal movement of the wedge promotes perpendicular outward movement of the respective stopped slips into closure engagement with the adjacent ports 24, 25.

In opening of the valve there is a reverse longitudinal movement of the wedge in an upward direction. There is with the turning of the hand wheel to open a closed valve, an initial movement of the two closure slips 36, 38 (see FIG. 6) in a perpendicular inward direction out of engagement with the adjacent ports 24, 25. It will be appreciated that because of this perpendicular disengagement of slips and ports, abrasive damage of seals 80, 81 (FIGS. 1a, 1b and 2) of the slips 36, 38 is avoided. No longitudinal movement (i.e. in a vertical direction) of the two closure slips 36, 38 occurs during this initial opening step even though the wedge 32 itself is being moved upwardly by the stem member 40. Upward longitudinal movement of the closure slips from the valve's closed position is dependent upon engagement of the underside of at least the right hand slip 38 by a spaced rectangular lifting lug 84 (FIGS. 2 and 8) suspended from the thin edge of the wedge 32. The lifting lug 84 must engage the underside of the slip having the two lower lugs 39 which lower lugs 39, in turn, support the overlying two lugs 37 of the other slip. In the design of the illustrated valve, the lifting lug 84 in actuality contacts the undersurface of both slips 36, 38.

The length of longitudinal movement in an upward direction of the wedge 32 from the valve's closed position independent of the two slips is determined by the length of lifting lug hanger 86 (see FIG. 3). When the lifting lug 84 first engages the underside of the closure slips 36, 38 as seen in FIG. 8, the initial phase of the valve opening is completed and upward movement of the two slips with the wedge then commences. Prior to this time, the slips will have been only moved in a perpendicular inward direction out of contact with the adjacent two ports 24, 25 by the upward longitudinal movement of the wedge 32.

Figure 9:
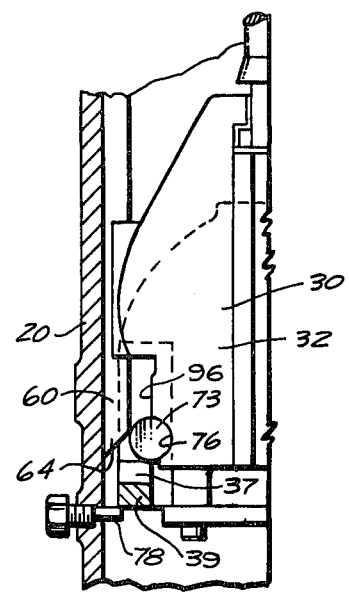
FIG. 9 is a view in close time sequence to that of FIG. 7 showing the roller in the wedge locking notch after having just left the ramp at the terminal end of the adjacent guide rail and showing the closure slip commencing to move in longitudinal displacement from previous alignment with the adjacent valve port.

The valve structure is designed to forestall premature upward movement of the two slips 36, 38 which may tend to occur due to a dragging frictional effect in the initial opening phase with the wedge commencing its upward movement. As best seen in FIG. 4 during this initial opening movement, the two slips are constrained from vertical motion by the two rollers 73 which are respectively lodged in confinement pockets provided by the upper surfaces of the upper lugs 39, the ramps 64 and short vertical surfaces 96 of the wedge immediately above the locking notches 76. When the lifting lug 84 in FIG. 8 engages the two slips 36, 38, the initial phase of the valve opening movement is completed as the two slips have moved inwardly out of engagement with their respective ports; at this time the respective two locking notches 76 of the wedge are in substantial alignment with the adjacent rollers 73 and further application of force by the lifting lug 84 causes the rollers 73 to overcome friction and move into their associated notches as illustrated in FIG. 9; at which time the closure slips are then fixed to the wedge and the assembly of slips and wedge may be moved to the full open position of the valve illustrated in FIGS. 10 and 11.

Thus, it is seen that the rollers 73 serve in two functions: a first function of locking the respective slips 36, 38 to the wedge 32 during downward movement of the wedge-slip assembly away from its open position of FIGS. 10 and 11, this forestalls premature outward movement of the slips; and a second function during the initial phase of the valve opening wherein the rollers forestall premature upward movement of the respective slips while permitting their perpendicular disengagement of the adjacent ports.

Referring to FIGS. 1a and 2, it will be seen that the seals 80, 81 are circular in configuration and held to the outside faces of the respective closure slips 36, 38 by seal retainer rings 82, 83. The two seal retainers 82, 83 are removably held by several spaced screws to the exterior faces of the two slips 36, 38. Another sealing arrangement is shown in FIG. 1b.

With downward longitudinal movement of the assembly 30 away from its first (valve open) location within the lateral passageway (FIGS. 10 and 11), there would be danger but for the roller detent arrangement of premature movement of the two closure slips 36, 38 into engagement with the walls of the passageway. The locking of the two closure slips 36, 38 to the wedge 32 via the two rollers 73, the locking notches 76 and the longitudinal edges of the guide rails 60, 61 assures that there will be no untimely contacting of the passageway walls by the descending closure slips 36, 38 during movement of the assembly 30 from its first location within the lateral passageway 28 to the second location within the fluid passageway 26. When the closure slips 36, 38 engage two stop pins 78, 79, the two slips 36, 38 are then in alignment with their adjacent valve ports 24, 25 and the two rollers 73 move out of their respective locking notches 76 of the wedge 32. In moving into this valve-closed position the rollers 73 escape from the longitudinal edges of the adjacent rails 60, 61 and move in contact with the ramps 64 along the unencumbered surfaces of two slip lugs 37.

With reference to FIGS. 3 and 4 it will be seen that while the guide rails 60, 61 terminate at the second assembly location, the two rails do commence again and extend into a second lateral passageway 87 of the valve. The second lateral passageway 87 is opposite in direction to the first 28, but in alignment therewith. Provision is made whereby the lifting lug 84 is moveably held by groove elements 89 at its opposite ends to the extended guide rails of the second lateral passageway 87. This feature of slideably holding the lifting lug 84 to the extended two guide rails gives added stability to movement of the slip-wedge assembly 30.

In the illustrated preferred embodiment of the valve a locking detent mechanism employing a roller 73 and associated locking notch 76 is located at both side edges of the wedge 32. In a less rugged, smaller version of the valve, a single roller 73 (and associated locking notch) is employed; in this version of the valve only one of the two guide rails needs to terminate at the second valve location.

In FIG. 2 the lifting lug 84 is shown with an optional stabilizing feature which comprises a pair of spaced dowel pins 90 adjacent one edge of the lifting lug. The illustrated two dowel pins 90 are oriented to fit into aligned holes 91 in the underside of the slip 38 when the lifting lug engages the slip in upward motion of the assembly 30. Similarly, the other side of the lifting lug 84 will be provided with like spaced dowel pins to engage the other slip 36; the latter two dowel pins are not illustrated in FIG. 2 to minimize cluttering of the drawing. The lifting lug 84 is fastened to the hangers 86 of the wedge 32 by screws 93.

Figure 12:
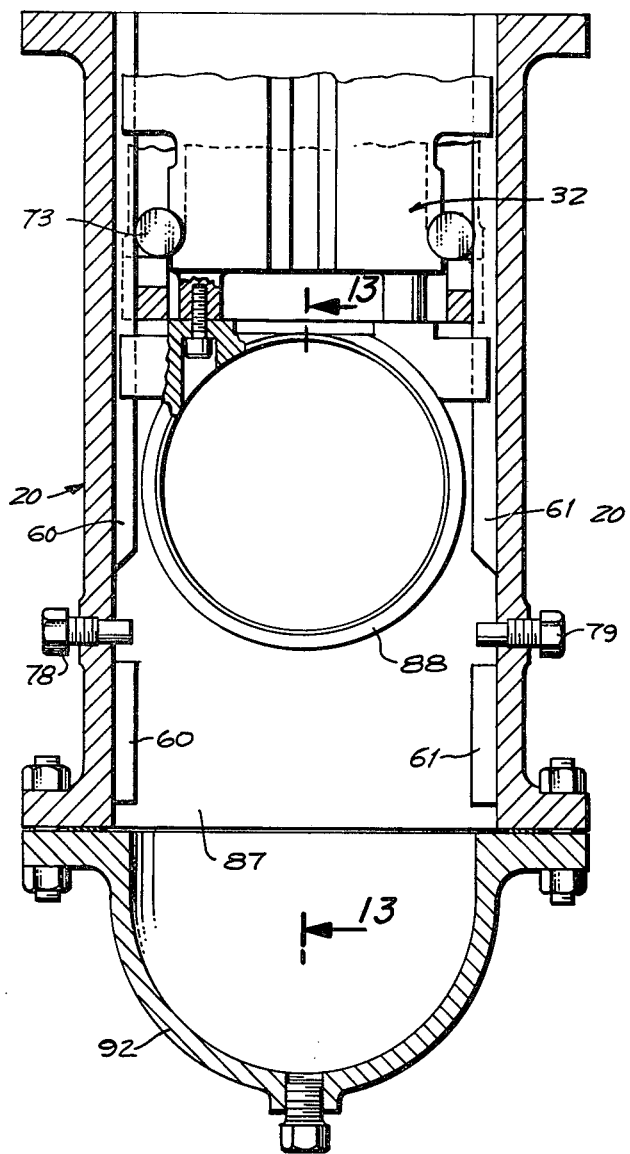
FIG. 12 is another embodiment of the valve of the invention having a moveable internal conduit segment which serves as the assembly lifting lug.
Figure 13:
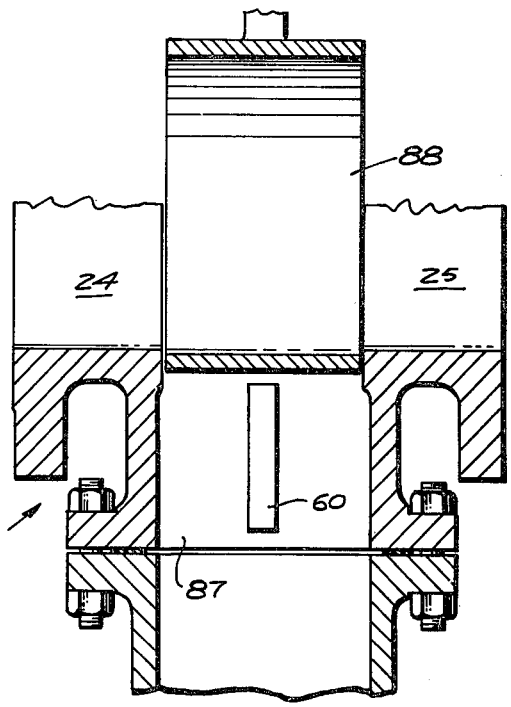
FIG. 13 is a fragmentary sectional view taken along line 13—13 of the valve embodiment of FIG. 12.

Another embodiment of the valve of the invention is illustrated in FIGS. 12–13. In this arrangement an internally-situated conduit segment 88 serves as the lifting lug 84 of the earlier described valve and is supported at the underside of the wedge 32. When the valve is in open position the conduit segment 88 directly connects the inlet and outlet ports 24, 25 providing a confined stream flow therebetween. It will be seen in FIG. 12 that the usual flat enclosure plate at the underside of the valve body is replaced with a bell shape member 92 of adequate volume to receive the conduit segment 88 in the valve-closed position.

Figure 15:
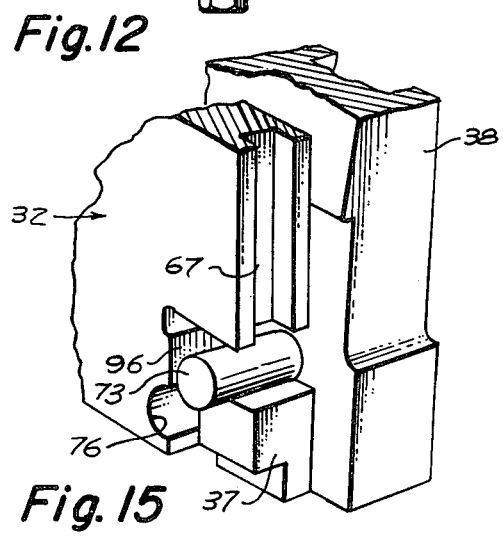
FIG. 15 is a fragmentary perspective detail view taken in area 15 of FIG. 14 showing relationships of elements of the detent locking mechanism with the valve in full port closure.
Figure 14:
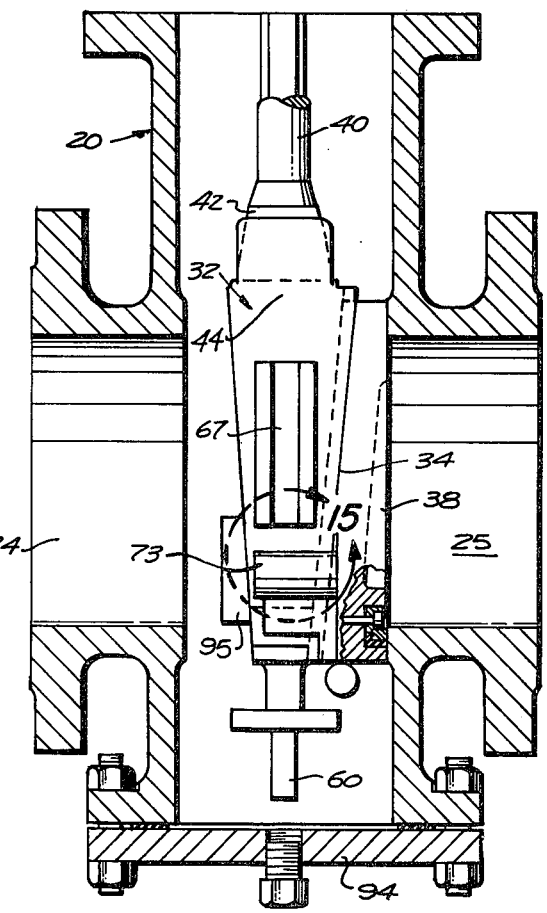
FIG. 14 is a sectional view of still another embodiment of the valve of the invention which embodiment employs a single closure slip.
Figure 16:
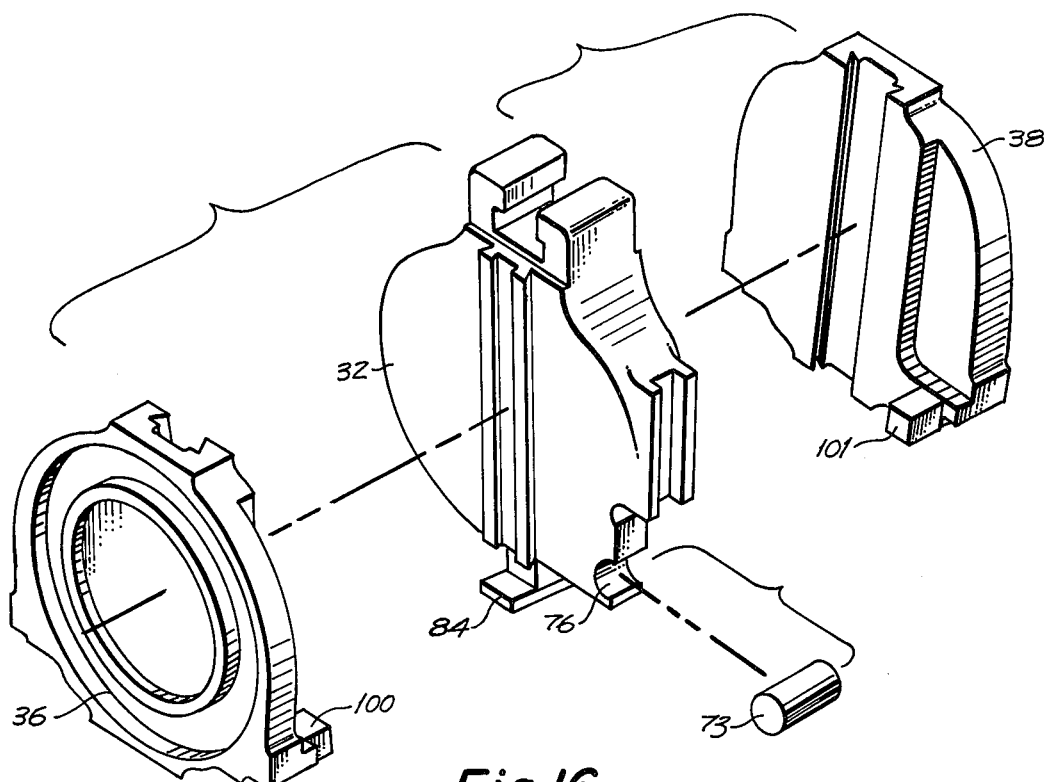
FIG. 16 is an exploded view of a portion of the elements of another version of the valve of the invention.

A third embodiment of the valve of the invention is illustrated in FIG. 14; this valve employs a single closure slip which closes only one of the two valve ports; this is a desirable feature in some chemical manufacture where it is important to avoid entrapment of liquid in the space between the two valve ports 24, 25 during valve closure. It will be remembered that the cylindrical locking rollers 73 are on the unobstructed upper surfaces of the two spaced lugs of the slip 38. Because only one slip is employed in this embodiment of FIG. 14, it is necessary to provide a closure 95 fastened to the wedge 32 to avoid axial movement of the rollers 73. The fragmentary view of FIG. 15 aptly illustrates the relative positions of each roller 73 and the supporting lug during valve closure; in this position it is seen that the roller has left the locking notch 76 of the wedge 32 and engages the short vertical surface 96 of the wedge immediately adjacent the locking notch. FIG. 15 is illustrative of the mechanism of the valve of FIGS. 3–11 as well as that of FIG. 14.

The design of the invention provides for easy access to the interior of the valve, from either above or below, without the valve's removal from the fluid line in which it is installed. This is a particularly desirable feature for replacement of the resilient seal; this is accomplished by first removal of a bottom closure plate 94 (see FIG. 4) and then removal of stop pins 78, 79. It will be recalled that normally, the stop pins 78, 79 limit longitudinal movement of the closure slips 36, 38; however, with the removal of the stop pins it is then possible to pass the slips beyond their usual stopped position and remove the slips from the valve for repair. Replacement of the resilient seals 80, 81 is then readily accomplished by removal of the retainer rings 82, 83 of closure slips 36, 38 (FIG. 2). The resilient seal 80 of FIG. 1b is cast and molded in place; a chemical solvent is employed to remove a worn seal.

Figures 17, 18:
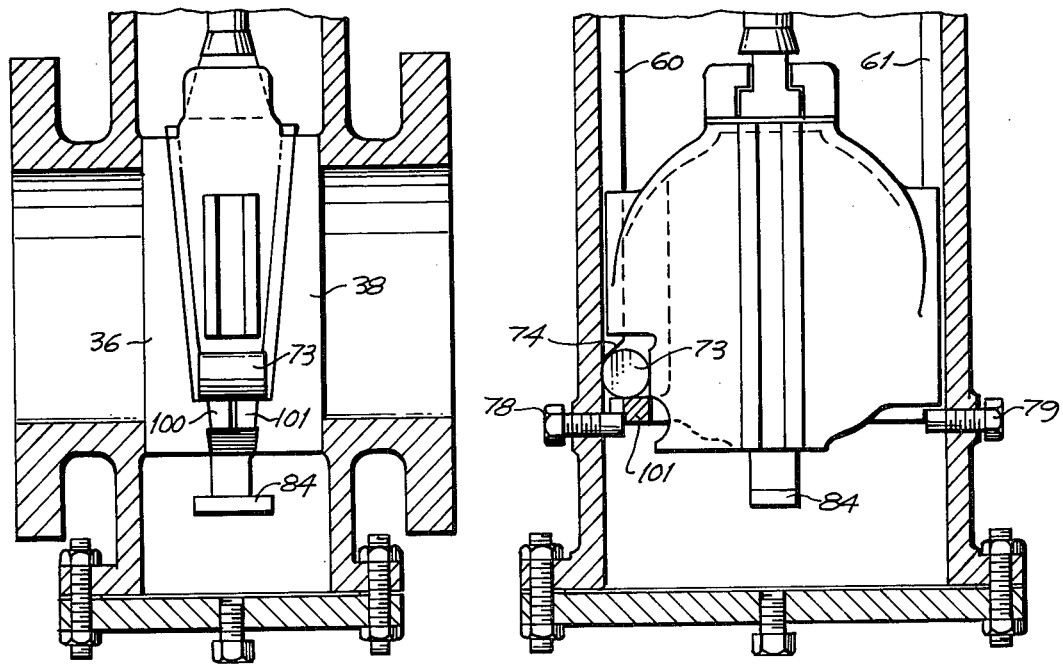
FIG. 17 is a longitudinal sectional view of the valve of the alternative embodiment of FIG. 16 showing the valve in its fully closed position with the closure slips forced outwardly by the central wedge member into engagement with inlet and outlet ports of the valve.
FIG. 18 is an elevational view in a plane perpendicular to that of FIG. 17 with one of the closure slips removed.
Figures 19, 20:
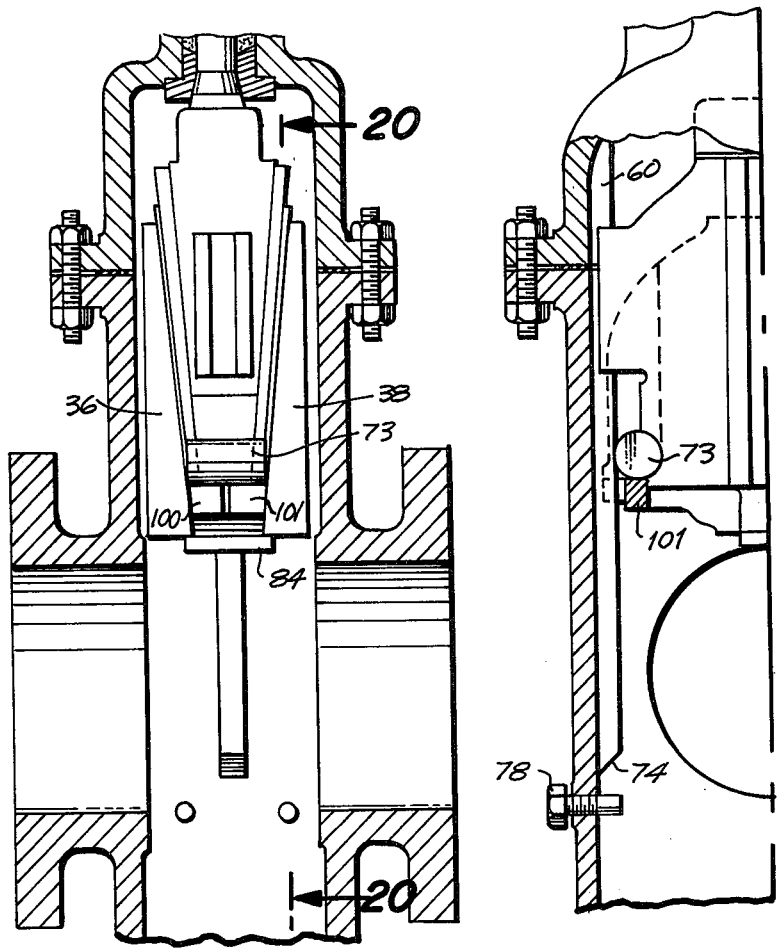
FIG. 19 is a longitudinal sectional view in considerable later time sequence to that of FIG. 18 showing the slip-wedge assembly in the valve full-open position with the inlet and outlet ports of the valve open to fluid flow.
FIG. 20 is a sectional view taken along line 20—20 of FIG. 19.

In the various embodiments of the valve illustrated in FIGS. 1–15, the roller has for its supporting surface a lug found on the inside face of a single slip. In the instance of the valve having two slips (FIGS. 2,3) a single lug provides the supporting surface for the roller and this lug overlies a cooperating lug of the other slip; this lug overlying arrangement assures that the two slips move together in an upward direction. The version of the valve illustrated in FIGS. 16–20 divides the direct supporting surface for the roller 73 between the two slips with the roller being carried at its opposite ends by ledges (lugs) 100, 101 on the inside faces of the respective two slips 36, 38. The operative surfaces of the ledges 100, 101 of the two slips 36, 38 supporting the roller 73 lie in a common plane perpendicular to direction of longitudinal movement of the wedgeslip assembly. With escape of the roller into contact with the ramp 74 in closing of the valve and simultaneous engagement of the underside of the slips 36, 38 by the stop 78, 79, further longitudinal movement downwardly of the wedge 38 causing the two slips 36, 38 to move into closure engagement with the adjacent valve ports as illustrated in FIGS. 17, 18. In opening the valve from the closed position of FIGS. 17 and 18, the wedge 32 commences its upper movement without the two slips 36, 38 which are precluded from upward motion at the outset by the roller 73 which engages the ramp 64. When the locking notch 76 has moved into alignment with the roller 73 application of additional upward force to the wedge 32 causes the roller 73 to move into the notch 76; thereafter the wedge-slip assembly is moved in a unit in an upward direction towards the full valve open position of FIGS. 19 and 20.

It will be seen that in the version of the valve of FIGS. 16–20 that a single roller is utilized; it will be appreciated that in some embodiments it will be desirable to employ a roller on each side edge of the wedge. A two roller arrangement gives added stability to the valve and will normally be used in larger versions of the valve. The supportive ledge concept of FIGS. 16–20 is adaptable to the single slip version of the valve of FIG. 14; in which application one end of the roller will be supported by a ledge of closure 95 (see FIG. 14) with the other end of the roller being supported by the ledge 101 of slip 38.

The valve of the embodiments of FIGS. 15–20 differs from the earlier described embodiments of the valve of the invention in having a lifting lug 84 which necessarily engages the underside of both slips 36, 38 in moving the wedge-slip assembly towards the valve open position; in the earlier illustrated versions of the valve there is employed an arrangement wherein a lug of one slip overlies that of the other which arrangement provides synchronization of the slips. In the instant version the simultaneous engagement of the underside of the two ledges 36, 38 by the lifting lug 84 provides the simultaneous upward motion of the ledges of the two slips.

Various modifications may suggest themselves to those skilled in the art without departing from the spirit of our invention, and, hence, we do not wish to be restricted to the specific form shown or uses mentioned, except to the extent indicated in the appended claims.

It is claimed:

1. In a linear retractable seal valve having a body with an inlet and outlet port and a fluid passageway therebetween, said body having a lateral passageway perpendicular to the fluid passageway with a wedge-slip assembly moveable longitudinally therein from a valve open first location within the lateral passageway to a distant second location where the assembly is positioned in the fluid passage-way between the two ports of the valve, said assembly having at least one closure slip with an inside face of the slip slideably enaging a tapering face of the wedge and with the slip at second location being restrained from further longitudinal movement and moveable in a perpendicular direction of the longitudinal assembly movement into closure engagement with one of the valve ports, two diametrically-opposed guide rails extending longitudinally of the inside face of the lateral passageway and into the fluid passageway, said assembly being moveably held by grooves at opposite side edges of the wedge to the guide rails of the valve body, said guide rails lying in a plane paralleling the two valve ports, with the valve being returned to its open position through a reverse sequential movement, the improvement:

wherein at least one of said rails terminates at the second location on the inside wall of the fluid passageway and with the end surface of the terminated rail providing a ramp;

said wedge on at least one side edge thereof having a locking notch extending in a transverse direction to the longitudinal assembly movement, said notch being in the side edge of the wedge adjacent the terminated rail;

a roller parallel to the locking notch in engagement with a supporting surface of the slip and positioned to move into and out of the notch at the second valve location, said roller when in the locking notch of the wedge and in engagement with the longitudinal edge of the adjacent guide rail serving to lock the slip to the wedge, thus precluding perpendicular movement of the slip during longitudinal movement of the assembly between the two valve locations, said roller in one of its positions unlocks the slip from the wedge by moving out of the locking notch and out of contact with the longitudinal edge of the rail and into engagement with the ramp at the end of said rail.

2. A valve in accordance with claim 1 wherein the groove stops short of the locking notch, with said notch being set inwardly of the groove and adjacent the thin edge of the wedge.

3. A valve in accordance with claim 1 wherein the wedge-slip assembly has two slips held respectively to the opposite tapering faces of the wedge with the roller being supported at its ends by ledges on the inside faces of the respective two slips.

4. In a linear retractable seal valve having a body with an inlet and an outlet port and a fluid passage-way therebetween, said body having a lateral passageway perpendicular to the fluid passageway with a wedge-slip assembly moveable longitudinally therein from a valve open first location within the lateral passageway to a distant second location where the assembly is positioned in the fluid passageway between the two ports of the valve, said assembly having at least one closure slip with an inside face of the slip slideably engaging a tapering face of the wedge and with the slip at said second location being restrained from further longitudinal movement and moveable in a perpendicular direction of the longitudinal assembly movement into closure engagement with one of the valve ports, two diametrically-opposed guide rails extending longitudinally of the inside face of the lateral passageway and into the fluid passageway, said assembly being moveably held by grooves at opposite side edges of the wedge to the guide rails of the valve body, said guide rails lying in a plane paralleling the two valve ports, with the valve being returned to its open position through a reverse sequential movement, the improvement:

wherein at least one of said rails terminates at the second location on the inside wall of the fluid passageway and with the end surface of the terminated rail providing a ramp;

said wedge on at least one side edge thereof having a locking notch extending in a transverse direction to the longitudinal assembly movement, said notch being in the side edge of the wedge adjacent the terminated rail;

a roller in engagement with a supporting surface of the slip, said roller having a first position wherein the roller is constrained to the locking notch of the wedge when in engagement with the longitudinal edge of said one of the guide rails, and a second position wherein the roller has moved out of the locking notch of the wedge and out of contact with the longitudinal edge of said rail and into engagement with the ramp at the end of the rail;

said roller in its first position acting to lock the slip to the wedge, thus forestalling perpendicular movement of the slip during longitudinal movement of the assembly between first and second locations; and said roller in its second position acting to forestall reverse longitudinal movement of the slip during opening of valve until completion of perpendicular disengagement of slip and adjacent valve port.

5. A valve in accordance with claim 4 wherein the groove stops short of the locking notch, with said notch being set inwardly of the groove and adjacent the thin edge of the wedge.

6. A valve in accordance with claim 4 wherein the roller in its second position is in engagement with the ramp and a flat surface of the side edge of the wedge, said flat surface being parallel to the guide rails and immediately adjacent the locking notch.

7. A valve in accordance with claim 4 wherein the wedge-slip assembly has two slips which are held to opposite tapering faces of the wedge and the supporting surface for the roller is shared between the two slips with the roller at its opposite ends engaging separate supporting planes of the respective two slips.

8. In a linear retractable seal valve having a body with an inlet and outlet port and a fluid passageway therebetween, said body having a lateral passageway perpendicular to the fluid passageway with a wedge-slip assembly moveable longitudinally therein from a valve open first location within the lateral passageway to a distant second location where the assembly is positioned in the fluid passageway between the two ports of the valve, said assembly having two closure slips with their respective inside faces slideably engaging separate tapering faces on the wedge located therebetween and with the two slips at said second location being restrained from further longitudinal movement and moveable in a perpendicular direction of the longitudinal assembly movement into closure engagement with the inlet and outlet valve ports respectively, two diametrically-opposed guide rails extending longitudinally of the inside face of the lateral passageway and into the fluid passageway, said assembly being moveably held by grooves at opposite side edges of the wedge to the guide rails of the valve body, said guide rails lying in a plane paralleling the two valve ports, with the valve being returned to its open position through a reverse sequential movement wherein the two slips are moved in a perpendicular direction out of closure engagement with the respective valve ports before commencing reverse longitudinal movement of the wedge-slip assembly away from the second valve location toward the first location, the improvement:

wherein at least one of the rails terminates at the second location on the inside wall of the fluid passageway with the end surface of the terminated rail providing a ramp;

said wedge having a locking notch on one of its side edges extending in a transverse direction to the longitudinal assembly movement;

a roller extending between the slips and associated with the notch of the wedge and adapted for movement into and out of the notch, said roller having a first and second position;

said roller in the first position being constrained to the locking notch of the wedge when in engagement with the longitudinal edge of the adjacent guide rail, said roller in the first position acting to lock the slips to the wedge, thus forestalling perpendicular movement of the slips during longitudinal movement of the assembly between first and second valve locations;

said roller in the second position having moved out of the locking notch of the wedge and out of contact with the longitudinal edge of the adjacent rail and into engagement with the ramp at the end of said rail, said roller in the second position during opening of the valve acting to forestall reverse longitudinal movement of the slips until completion of perpendicular disengagement of slips from the adjacent valve ports.

9. A valve in accordance with claim 8 wherein the wedge groove stops short of the locking notch with the locking notch being set inwardly of the groove and adjacent the thin edge of the wedge.

10. A valve in accordance with claim 8 wherein the roller in its second position is in engagement with the ramp of the adjacent rail and a flat surface of the side edge of the wedge, said flat surface being parallel to the guide rail and immediately adjacent the locking notch.

11. A valve in accordance with claim 8 wherein the roller is supported at its opposite ends by ledges on the inside faces of the respective two slips.

* * * * *

UNITED STATES PATENT AND TRADEMARK OFFICE
CERTIFICATE OF CORRECTION

PATENT NO. : 4,162,057
DATED : July 24, 1979
INVENTOR(S) : Javed Qasim

It is certified that error appears in the above—identified patent and that said Letters Patent is hereby corrected as shown below:

In the Abstract, paragraph 2, line 30, change "valve" to
--roller--.
Column 1, line 64, change "and there" to --and from there--.
Column 2, line 46, change "Fig. 31" to --Fig. 3--.
Column 5, line 65, change the phrase "the upper lugs 39" to
--the upper lugs 37--.
Column 7, line 7, change "underside" to --underedge--.
line 21, change "providing" to --to provide--.
Column 8, line 16, change "causing" to --causes--.
line 41, change "Figs. 15-20" to --Figs. 16-20--.
Column 9, line 1, change "at second" to --at said second--.

THIS CERTIFICATE SUPERSEDES CERTIFICATE OF CORRECTION ISSUED January 29, 1980.

Signed and Sealed this

Eleventh Day of March 1980

[SEAL]

Attest:

Attesting Officer

SIDNEY A. DIAMOND

Commissioner of Patents and Trademarks